United States Patent [19]

Trenam

[11] 3,893,120
[45] July 1, 1975

[54] OMNIDIRECTIONAL RING ANTENNA FOR EW AMPLITUDE COMPARISON DIRECTION FINDING

[75] Inventor: Richard S. Trenam, Adelaide, Australia

[73] Assignee: The United States of America as represented by the Secretary of the Navy, Washington, D.C.

[22] Filed: Aug. 13, 1970

[21] Appl. No.: 63,375

[52] U.S. Cl............. 343/119; 343/113 R; 343/731; 343/824
[51] Int. Cl.² .......................................... G01S 3/28
[58] Field of Search ......... 343/731, 732, , 824, 905, 343/119, 113

[56] References Cited
UNITED STATES PATENTS
| | | | |
|---|---|---|---|
| 2,235,163 | 3/1941 | Peterson | 343/732 |
| 2,942,262 | 6/1960 | Shanks et al. | 343/771 X |
| 3,202,995 | 8/1965 | Schultz | 343/732 |

Primary Examiner—Malcolm F. Hubler
Assistant Examiner—Richard E. Berger
Attorney, Agent, or Firm—R. S. Sciascia; G. J. Rubens; T. M. Phillips

[57] ABSTRACT

Amplitude comparison DF apparatus for measuring the direction of incoming RF signals. The apparatus comprises an omnidirectional ring antenna for receiving incoming RF signals. The antenna consists of a ring of air spaced coaxial cable having a plurality of radiating elements symmetrically spaced and positioned about the circumference of the ring in an energy coupling relationship with respect to the ring. Probe apparatus are provided for sampling the coupled energy at selectively predetermined points on the circumference of the ring antenna. Comparison apparatus are provided for comparing the amplitudes of the coupled energy at several sampling points whereby the direction of the incoming RF signal can be determined.

3 Claims, 3 Drawing Figures

OMNIDIRECTIONAL RING ANTENNA FOR EW AMPLITUDE COMPARISON DIRECTION FINDING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Existing amplitude comparison DF techniques function by comparing the amplitude with which an incoming RF signal is received by two different directional antennas that are pointed in different directions. Incoming RF signals in the region between the two directions of the antennas are received by the antennas. The relative strengths with which the antennas receive the incoming signals are used to determine the direction of the signals. Each antenna must be followed by amplifier-detector apparatus to measure and compare the received signal levels. For EW i.e., electronic warfare purposes, it is often desired to monitor all signals above a given threshold over 360° of azimuth. Since even very short signals (pulses) can be of interest, the DF measurement must be made at the first detection of the signal. Thus the DF system must at all times be operationally ready to make bearing measurements on signals from any azimuth.

A number of directional antennas are required to achieve amplitude comparison DF measurements over 360° of azimuth. Furthermore, as previously stated, to achieve continuous monitoring over 360° of azimuth each directional antenna must be followed by an amplifier-detector apparatus.

SUMMARY OF THE INVENTION

Amplitude comparison DF apparatus for measuring the direction of incoming RF signals is disclosed. The apparatus comprises a large omnidirectional ring array antenna. The antenna consists of a ring of air spaced coaxial cable having a number of radiator elements symmetrically spaced and positioned about the circumference of the cable in an energy coupling relationship with respect to the cable. Incident energy upon the radiators travels around the ring and radiates from the radiator elements, whereby a predetermined energy distribution pattern is produced on the ring. Probe apparatus are provided for sampling the amplitude of the energy distribution at selectively predetermined points on the circumference of the ring antenna. The direction of the RF signal is determined by comparing the sampled amplitudes. The invention makes possible a much larger angle coverage with a relatively small number of channels for amplifying signals and with minimal loss of DF accuracy. The invention can provide an amplitude comparison DF performance equivalent to conventional multiple-antenna DF systems but using only one-half the number of signal amplifying channels required in a conventional system.

STATEMENT OF THE OBJECTS OF THE INVENTION

It is the primary object of the present invention to provide amplitude comparison DF apparatus that can achieve an amplitude comparison DF performance equivalent to conventional multiple-antenna DF systems but which requires only half the number of signal amplifying channels required in a conventional DF system.

Other objects, advantages and novel features of the invention will become apparent from the following detailed description of the invention when considered in conjunction with the accompanying drawings wherein:

DESCRIPTION OF THE PREFERRED EMBODIMENT

Figure 1:
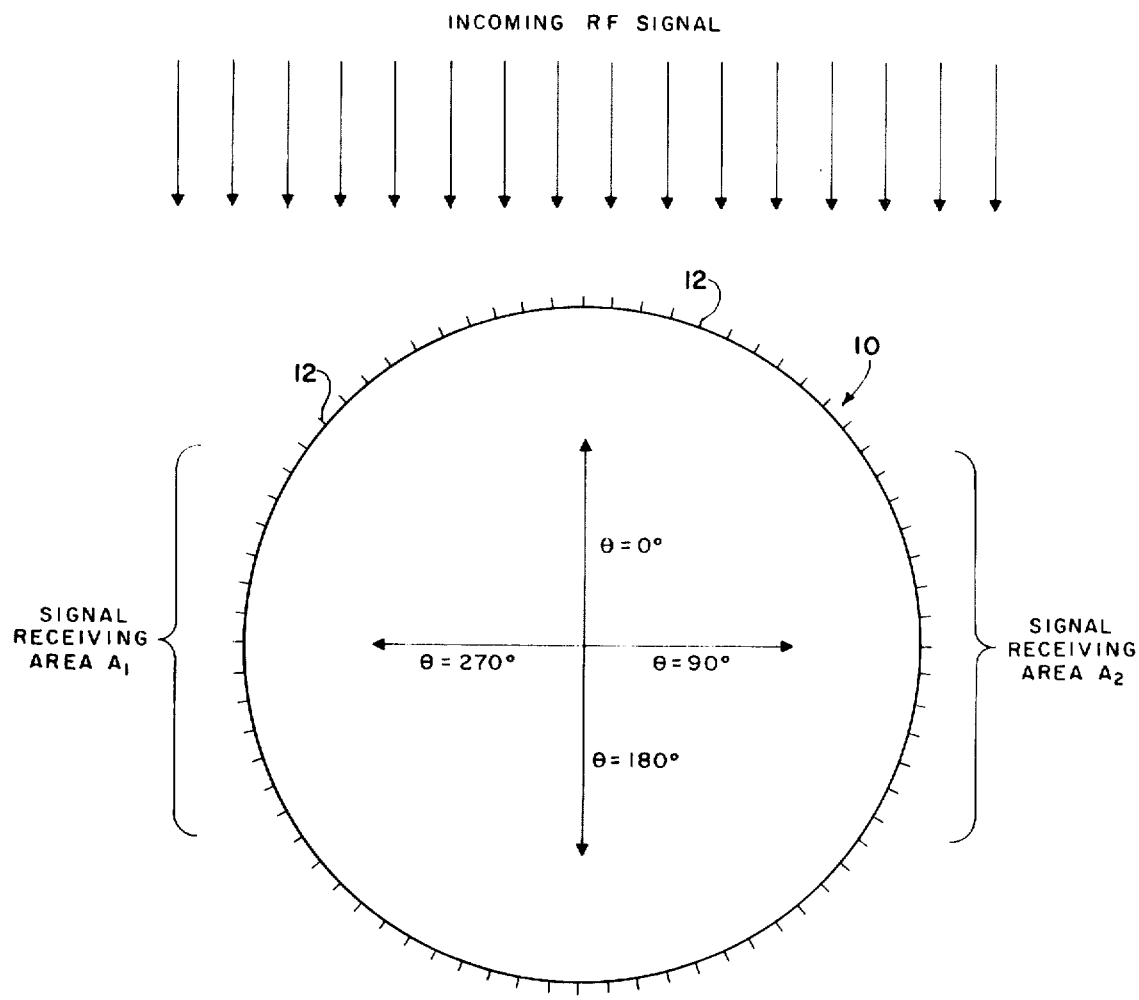
FIG. 1 is a simplified illustration of an amplitude comparison DF apparatus embodying the inventive concept disclosed herein.

FIG. 1 is a simplified illustration of an omnidirectional ring antenna that can be used for amplitude comparison DF functions in accordance with the inventive concept disclosed herein. In FIG. 1 a ring antenna 10 is shown having symmetrically spaced and disposed about the circumference thereof a plurality of radiating elements 12. The ring antenna 10 consists of a coaxial cable having an air dielectric whereby the phase velocity of received signals carried by the cable is approximately equal to the velocity of radio signals in the atmosphere.

The ring antenna is a complete horizontal circle for measuring azimuth and the circumference of the circle is generally equal to a large number of wavelengths of the signal. For example, at X-band the circumference might be equal to 200 to 300 wavelengths.

The radiating elements are disposed about the circumference of the ring in a loosely coupled manner with respect to the ring to avoid undesirable lobes in the polar diagram patterns. Any one of several well-known conventional electromagnetic energy coupling techniques can be utilized since all that is necessary is that an electromagnetic field be created between the boundary of the cable and the center conductor to allow the wave to travel in the ring. The loss of energy due to radiation should be less than about 1 db per 5° of circumference as the signal travels along the cable, and the elements should be matched to the coaxial cable whereby reflected waves are not generated in the cable.

The elements can comprise monopoles that are disposed about the circumference of the ring with the axis of the monopoles horizontal and normal to a cylindrical surface about which the cable can be wound and supported and that forms the ground plane. The elements should be staggered vertically to minimize the coupling between the elements.

The omnidirectional ring antenna 10 operates in the following manner as an amplitude comparison DF apparatus. Assume that incoming RF signals approach the antenna 10 in the direction indicated by the arrows in FIG. 1. Near the regions $\theta = 90°$ and $\theta = 270°$ shown as signal receiving areas $A_1$ and $A_2$, respectively, the ring functions as a conventional end-fire array whereby it absorbs energy from the incoming RF signals. The absorbed energy travels clockwise around the ring from $\theta = 90°$ towards increasing values of $\theta$ and counterclockwise from $\theta = 270°$ towards the decreasing values of $\theta$.

As the coupled energy travels around the ring it couples with and radiates from the radiating elements whereby the energy level, i.e., amplitude distribution on the circumference of the ring progressively declines. In the area where $\theta = 180°$ a standing wave pattern is produced where the two coupled signals traveling in the ring in opposite directions meet.

Figure 2:
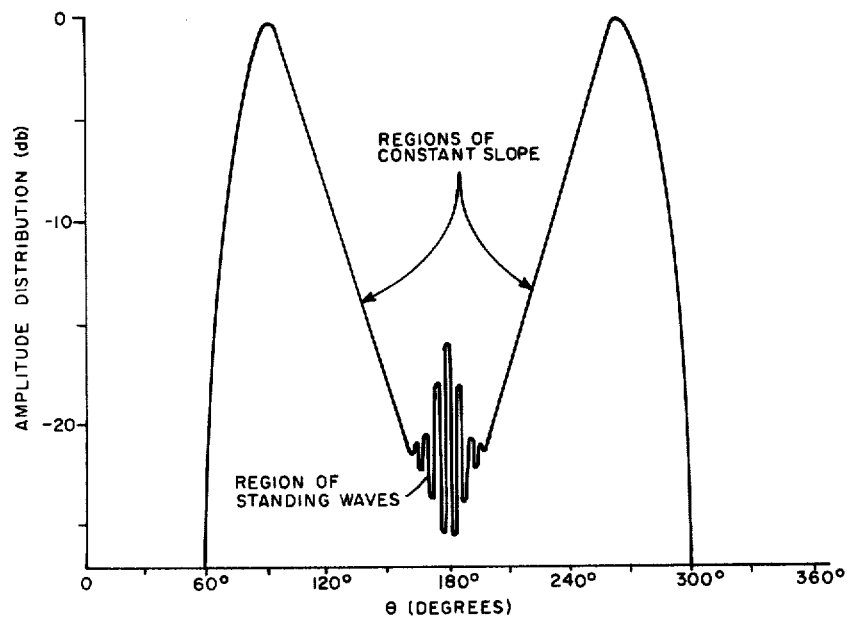
FIG. 2 is an exemplary graphical representation of the coupled energy distribution about the circumference of the ring antenna of FIG. 1.

FIG. 2 is an exemplary graphical illustration of the resulting energy distribution produced on the omnidirectional ring antenna 10 by RF signals as shown in FIG. 1. FIG. 2 clearly shows that the peak amplitudes are produced near the areas $A_1$ and $A_2$ and that a standing wave pattern is produced in the area where $\theta = 180°$. It can also be seen that the regions between $\theta = 90°$ and $\theta = 180°$ and between $\theta = 180°$ and $\theta = 270°$ the energy distribution curves represent regions of substantially constant slope.

Conventional probe apparatus are coupled to the ring antenna whereby the signal amplitude at various selectively predetermined points on the circumference of the ring are sampled. The energy distribution shown in FIG. 2 clearly shows that signal direction can be determined by comparing the sampled amplitudes. That is, the technique of sampling the amplitude distribution at points on the ring antenna 10 of FIG. 1 can be utilized for amplitude comparison DF determinations because, as seen in FIG. 2, the direction of the peaks depends only upon the velocity of the signal in the cable and because DF determinations are relatively simple to make independent of frequency over wide bandwidth. Furthermore the slope in the regions of constant slope depends primarily upon the coupling existing between the radiating elements and the coaxial cable, which coupling can be held constant over wide bandwidths by conventional design techniques.

Figure 3:
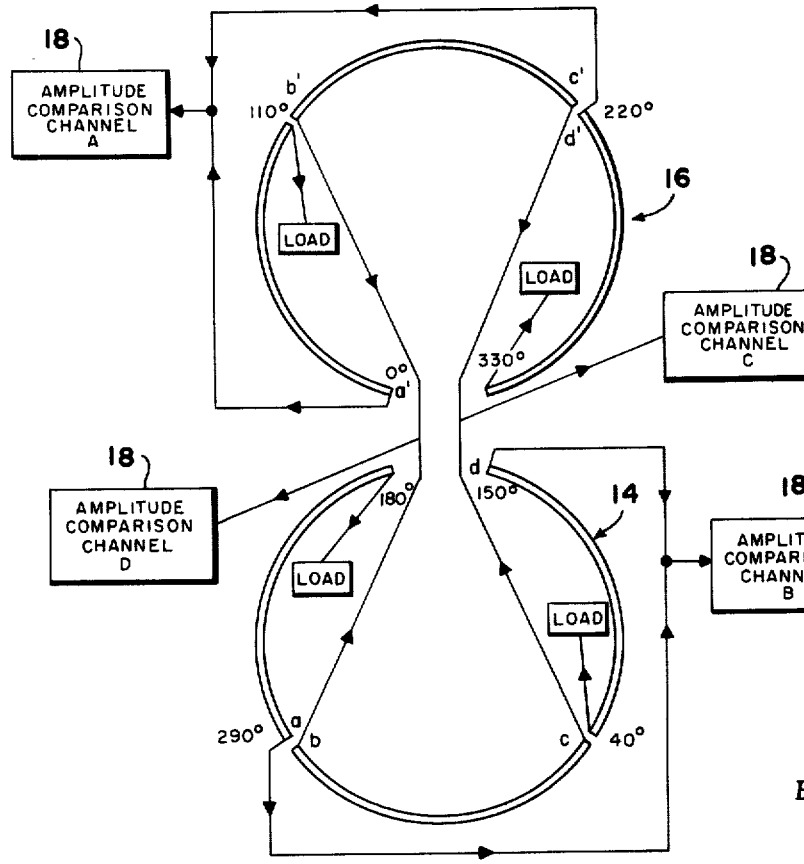
FIG. 3 is a simplified schematic drawing of a four-channel amplitude comparison DF system embodying the present inventive concept.

FIG. 3 illustrates a four-channel amplitude comparison DF system embodying the inventive concept disclosed herein. The system can provide a DF measurement potential of, for example, 3° RMS for an amplitude comparison accuracy of approximately 1 dB RMS and can provide an amplitude comparison DF performance substantially equivalent to a conventional, prior art eight-channel system.

The system of FIG. 3 comprises two omnidirectional ring antennas 14 and 16 of the type shown in FIG. 1. The two antennas are shown positioned side-to-side merely to simplify the explanation of FIG. 3. In practice the antennas would be positioned one upon the other. The ring antenna 14 has four feed points $a$, $b$, $c$, and $d$; likewise, the ring antenna 16 has four feed points $a'$, $b'$, $c'$, and $d'$.

Each ring antenna consists of three identical sections of coaxial cable, each section being equal to 110° of the circumference of the ring. The three coaxial cables are disposed in an end-to-end manner whereby a gap of 30° between the ends of two of the cables results as shown in FIG. 3.

Each of four conventional amplitude comparison channels 18 is connected to two feed points. For example, channel A is connected to the feed or probe points $a'$ and $d'$ on the ring antenna 16, and channel B is connected to the feed or probe points $a$ and $d$ on the ring antenna 14.

The above connections could be accomplished, for example, by continuing the different cable sections as the feeds to the corresponding channels, with two such feeds being joined to provide signals to each channel. The ends of the antenna sections that are not required to provide signals should be terminated in matched loads as shown in FIG. 3.

The DF system of FIG. 3 operates to provide amplitude comparison DF in the following manner. First, assume that each of the four amplitude comparison or receiving channels in FIG. 3 is stabilized so that measurements of the relative signal levels between any two channels can be made to an accuracy of approximately 1 dB RMS. Secondly, assume that the signal environment and the system design are such that there is only one signal present in the system of FIG. 3 when a measurement of relative amplitude is being made.

Based on these assumptions, the system of FIG. 3 can be used to determine direction of incoming signals by measuring the four following relative amplitudes:

Channel A relative to Channel B
Channel A relative to Channel C
Channel D relative to Channel B
Channel D relative to Channel C Three basic steps are involved in determining the direction of an incoming RF signal received by the system of FIG. 3. First, the incoming signal is examined and a decision is made as to its approximate direction. This first step removes substantially all ambiguities that might exist in the simple comparison measurement that finally determines direction. Secondly, a decision is made as to which two of the sampled signals are to be compared in amplitude in order to derive direction. Finally, the amplitude comparison measurement is made whereby the direction of the incoming signal is determined.

In practice the above steps cannot be accomplished between time a signal is detected and the time that the amplitude comparison measurement is made. The normal procedure therefore is to make all the necessary measurements in parallel and as rapidly as possible. The resulting measurements are then used to decide which results are significant and which amplitude comparison is to be used to determine direction.

The above procedure can be accomplished, for example, by making a total of eight amplitude comparison measurements for each received signal. In the first step all four channels are "power detected," i.e., the detector output is proportional to power, and the outputs of the detectors are summed to provide a reference level. Amplitude comparison measurements are then made between this reference level and each of the four separate channel outputs. These measurements are required to make the first two decisions discussed above. In the second step a direct amplitude comparison measurement is made between four pairs of channels, namely A and B, A and C, D and B, and D and C. One of these four measurements is then selected to determine the actual direction of the incoming signal.

Thus it can be seen that a new and novel ring antenna apparatus for amplitude comparison DF has been disclosed. The apparatus can achieve an amplitude comparison DF performance equivalent to conventional multi-channel systems but requiring only one-half the number of signal amplifying and comparison channels as the conventional systems. Each channel is fed from two or more signal sources whereby each channel can provide primary amplitude-bearing data over two or more ranges of azimuth angles.

Obviously many modifications and variations of the present invention are possible in the light of the above teachings. It is therefore to be understood that within the scope of the appended claims the invention may be practiced otherwise than as specifically described.

What is claimed is:

1. Apparatus for measuring the direction of incoming RF signals comprising:
   an omnidirectional ring antenna for receiving said RF signals,
   said antenna consisting of a ring of air-spaced coaxial cable and a selectively predetermined number of radiating elements symmetrically spaced and disposed about said coaxial cable in an energy coupling relationship with respect to said coaxial cable,
   probe means for sampling the coupled energy level at selectively predetermined points on said ring antenna, and
   means for comparing the sampled energy levels derived by said probe means whereby the direction of said incoming RF signals can be determined.

2. The apparatus of claim 1 wherein said radiating elements comprise monopoles that are staggered vertically with respect to each other.

3. Apparatus for measuring the direction of received RF signals comprising:
   a pair of omnidirectional ring antennas for receiving said RF signals,
   each of said ring antennas comprising three equal-length sections of coaxial cable arranged in an end-to-end manner, and a plurality of radiating elements disposed in a symmetrical, closely spaced manner about the lengths of said sections of coaxial whereby said RF signals received by said ring antennas are coupled to said radiating elements,
   four amplitude comparison means,
   each of said amplitude comparison means being connected to a selectively predetermined sampling point on two different ones of said sections of coaxial cables.

* * * * *